US 12,116,008 B2

United States Patent
Hotson et al.

(10) Patent No.: US 12,116,008 B2
(45) Date of Patent: Oct. 15, 2024

(54) ATTENTIONAL SAMPLING FOR LONG RANGE DETECTION IN AUTONOMOUS VEHICLES

(71) Applicant: Argo AI, LLC, Pittsburgh, PA (US)

(72) Inventors: Guy Hotson, Mountain View, CA (US); Richard L. Kwant, San Bruno, CA (US); Deva K. Ramanan, Pittsburgh, PA (US); Nicolas Cebron, Sunnyvale, CA (US); Chao Fang, Sunnyvale, CA (US)

(73) Assignee: Argo AI, LLC, Pittsburgh, PA (US)

( * ) Notice: Subject to any disclaimer, the term of this patent is extended or adjusted under 35 U.S.C. 154(b) by 377 days.

(21) Appl. No.: 17/471,494

(22) Filed: Sep. 10, 2021

(65) Prior Publication Data
US 2023/0084623 A1     Mar. 16, 2023

(51) Int. Cl.
*B60W 60/00*     (2020.01)
*G06F 18/213*    (2023.01)
(Continued)

(52) U.S. Cl.
CPC ......... *B60W 60/001* (2020.02); *G06F 18/213* (2023.01); *G06F 18/214* (2023.01);
(Continued)

(58) Field of Classification Search
CPC .......... B60W 60/001; B60W 2420/42; B60W 2420/52; G06F 18/213; G06F 18/214;
(Continued)

(56) References Cited

U.S. PATENT DOCUMENTS 8,605,947 B2   12/2013   Zhang et al.
9,428,196 B2    8/2016   Ono
(Continued)

FOREIGN PATENT DOCUMENTS

CN    111428943 A    7/2020
JP    2019167039 A   10/2019

OTHER PUBLICATIONS

International Search Report and Written Opinion issued Dec. 10, 2021 in Application No. PCT/US2021/045257 (12 pages).
(Continued)

*Primary Examiner* — Tyler D Paige
(74) *Attorney, Agent, or Firm* — Fox Rothschild LLP (57) ABSTRACT

Methods and systems for detecting objects near an autonomous vehicle (AV) are disclosed. An AV will capture an image. A trained network will process the image at a lower resolution and generate a first feature map that classifies object(s) within the image. The system will crop the image and use the network to process the cropped section at a higher resolution to generate a second feature map that classifies object(s) that appear within the cropped section. The system will crop the first feature map to match a corresponding region of the cropped section of the image. The system will fuse the cropped first and second feature maps to generate a third feature map. The system may output the object classifications in the third feature map to an AV system, such as a motion planning system that will use the object classifications to plan a trajectory for the AV.

16 Claims, 6 Drawing Sheets

(51) Int. Cl.
*G06F 18/214* (2023.01)
*G06N 3/02* (2006.01)
*G06V 20/58* (2022.01)

(52) U.S. Cl.
CPC .............. *G06N 3/02* (2013.01); *G06V 20/58* (2022.01); *B60W 2420/403* (2013.01); *B60W 2420/408* (2024.01)

(58) Field of Classification Search
CPC ........ G06F 18/254; G06N 3/02; G06V 20/58; G06V 10/82
See application file for complete search history.

(56) References Cited

U.S. PATENT DOCUMENTS

| | | | |
|---|---|---|---|
| 9,594,378 | B2 | 3/2017 | Laur et al. |
| 10,317,771 | B2 | 6/2019 | Kim et al. |
| 10,445,928 | B2 | 10/2019 | Nehmadi et al. |
| 10,452,926 | B2 | 10/2019 | Brueckner et al. |
| 10,599,930 | B2 | 3/2020 | Lee et al. |
| 10,755,114 | B1 | 8/2020 | Wang et al. |
| 2017/0327112 | A1 | 11/2017 | Yokoyama et al. |
| 2018/0348777 | A1* | 12/2018 | Kawabe .............. G05D 1/0223 |
| 2019/0025853 | A1 | 1/2019 | Julian et al. |
| 2019/0043327 | A1 | 2/2019 | Stent |
| 2019/0057507 | A1 | 2/2019 | El-Khamy et al. |
| 2019/0147296 | A1* | 5/2019 | Wang ................. G06F 18/2148 382/157 |
| 2019/0210591 | A1 | 7/2019 | Low et al. |
| 2019/0279046 | A1 | 9/2019 | Han et al. |
| 2019/0333373 | A1 | 10/2019 | Fang et al. |
| 2020/0011693 | A1 | 1/2020 | Yoo et al. |
| 2020/0134772 | A1 | 4/2020 | Poudel Karmatha et al. |
| 2020/0142421 | A1* | 5/2020 | Palanisamy ............ G06N 3/044 |
| 2020/0160559 | A1 | 5/2020 | Urtasun et al. |
| 2020/0210778 | A1* | 7/2020 | Orlov .................... G06F 18/217 |
| 2020/0304835 | A1* | 9/2020 | Liu ........................ H04N 19/91 |
| 2020/0410254 | A1* | 12/2020 | Pham ................... G06V 30/274 |
| 2021/0107476 | A1 | 4/2021 | Cui |
| 2021/0156963 | A1* | 5/2021 | Popov ..................... G06N 3/045 |
| 2021/0181757 | A1* | 6/2021 | Goel ....................... G05D 1/628 |
| 2021/0269059 | A1 | 9/2021 | Djuric et al. |
| 2021/0350150 | A1* | 11/2021 | An ......................... G06F 18/214 |
| 2021/0390747 | A1* | 12/2021 | Feng ....................... G06T 11/60 |
| 2023/0084623 | A1* | 3/2023 | Hotson ................. G06F 18/254 701/23 |

OTHER PUBLICATIONS

Lin, T.Y. et al., "Feature Pyramid Networks for Object Detection", arXiv:1612.03144 [cs.CV], Apr. 19, 2017 (10 pages) available at https://arxiv.org/abs/1612.03144.

Krizhevsky, A. et al., "ImageNet Classification with Deep Convolutional Neural Networks", Communications of the ACM, 60(6):87-90, Jun. 2017, (9 pages) available at https://doi.org/10.1145/3065386.

* cited by examiner

ATTENTIONAL SAMPLING FOR LONG RANGE DETECTION IN AUTONOMOUS VEHICLES

BACKGROUND

The present disclosure relates to object detection and, in particular, to performing attentional sampling and multi-level attention-based object detection in autonomous vehicles.

Object detection is a process that helps autonomous vehicles (AVs) to understand the environment surrounding the AVs and to localize surrounding objects. AVs generate trajectories along which the AVs travel. Objects can be located along those trajectories (which can cause a collision) or traveling along a path that would place the object along those trajectories. AVs are configured to be mobile and are generally capable of traveling many miles at a time. Because of this, AVs will identify objects that are both close to the AV and far away from the AV.

Sensors coupled to the AV are generally used during object detection. These sensors may, for example, include image capturing devices (e.g., cameras), RADAR systems, light detection and ranging (LIDAR) systems, and/or one or more other suitable sensor types. Image capturing devices generate pixelated images. Since these images are pixelated, the farther an object is from the AV, the smaller the object appears in the pixelated image, lowering the resolution of the object. The lower the resolution of the object, the more difficult it is to detect the object. As a result, objects that are farther away from the AV are easier to detect when the image, on the whole, is at a higher resolution. However, due to the file size of high resolution imagery, it is computationally infeasible to process images on an AV at such a high resolution. In order to fit in the computational budget of the AV, images are typically downsampled, causing accuracy for small distant objects to drop precipitously, making it more difficult to detect objects in the captured images.

For at least these reasons, a means of selectively sampling portions of an environment surrounding an AV in order aid in detecting objects within the environment is needed.

SUMMARY

Methods and systems for performing long range object detection for use in utonomous vehicle (AV) perception and/or motion planning are disclosed. One or more sensors coupled to the AV will capture an image of a scene that is in an environment of the AV. The system will use a trained neural network to process the image at a first resolution and generate a first feature map that classifies one or more objects within the image. The system will crop the image, and it will use the neural network to process the cropped section at a second resolution that is higher than the first resolution and to generate a second feature map that classifies one or more of the objects that appear within the cropped section. The system will crop (and optionally resize) the first feature map to match a corresponding region (and size, if applicable) of the cropped section of the image. The system will fuse the cropped first feature map and the second feature map to generate a third feature map. The third feature map will include object classifications from the second feature map for the one more objects that are classified in the second feature map, and object classifications from the first feature map for one or more objects that at least partially appear in the cropped first feature map but are not classified in the second feature map. The system will then output the object classifications of the third feature map to an AV system, such as a motion planning system that may use the object classifications to plan a trajectory for the AV.

In some embodiments, the system may use the neural network to analyze the third feature map to identify one or more of the objects that are in the third feature map and within a first trajectory of the AV. If so, then when planning the trajectory for the AV the system may generate a new trajectory for the AV, wherein the new trajectory is configured to cause the AV to avoid the one or more objects that are in the third feature map.

In some embodiments, the cropped section comprises: (a) a region including one or more objects that are found in 3-dimensional map data of an environment surrounding the AV; or (b) a region of interest determined via an attentional machine learning analysis of the environment surrounding the AV.

In some embodiments, to process the image at the first resolution the system may process the image with a feature extraction network and upsample one or more object features within the image to a higher resolution in the first feature map.

In some embodiments, to process the cropped section the system may upsample one or more object features within the cropped section to a higher resolution in the second feature map.

In some embodiments, when processing the image at the first resolution the system may do so concurrently with the processing of the cropped section at the second resolution. Alternatively, the system may process the image at the first resolution independently from the processing of the cropped section at the second resolution.

This document also discloses a computer readable medium containing programming instructions that are configured to cause a processor to implement the processes described above and below.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "module" refers to a set of computer-readable programming instructions, as executed by a processor, that cause the processor to perform a specified function.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (AV) is a vehicle having a processor, programming instructions and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

The term "actor" refers to a moving or moveable object that the AV detects in its environment. The term "actor" includes, but is not limited to, vehicles, pedestrians, cyclists, and/or other objects which can move into the AV's path.

When used in the context of AV motion planning, the term "trajectory" refers to the plan that the AV's motion planning system will generate, and which the AV's motion control system will follow when controlling the AV's motion. A trajectory includes the AV's planned position and orientation at multiple points in time over a time horizon, as well as the AV's planned steering wheel angle and angle rate over the same time horizon. An AV's motion control system will consume the trajectory and send commands to the AV's steering controller, brake controller, throttle controller and/or other motion control subsystem to move the AV along a planned path.

When used in the context of actor motion prediction, a "trajectory" of an actor that a vehicle's perception or prediction systems may generate refers to the predicted path that the actor will follow over a time horizon, along with the predicted speed of the actor and/or position of the actor along the path at various points along the time horizon.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Autonomous vehicles (AVs) generally include one or more sensors used to capture images of the surrounding environment of their respective AV, which are then analyzed in order to detect and classify one or more objects present in the surrounding environment. Since the sensors are each coupled to their respective AV, an object's size in the captured image will decrease as its distance from the AV increases. Additionally, as the distance from the AV increases, so does the area of the surrounding environment.

Due to this increase in area, the farther an object is from an AV, the less likely the object is of interest to the trajectory of the AV. Accordingly, distant objects that may be of interest to an AV are typically present in only a small region (or a small plurality of regions) of a captured image. For example, when driving down a straight flat road, any small and distant objects that are relevant to the AV are likely only present in an area directly in front of the AV. However, as an object gets closer to the AV, the likelihood of it being of interest increases. For example, an object off to the side of the road, or off the road, may be of interest if it is relatively close (e.g., 80 m or closer) to the AV. It is noted, however, that other distances may be implemented when determining if an object is of interest.

Figure 1:
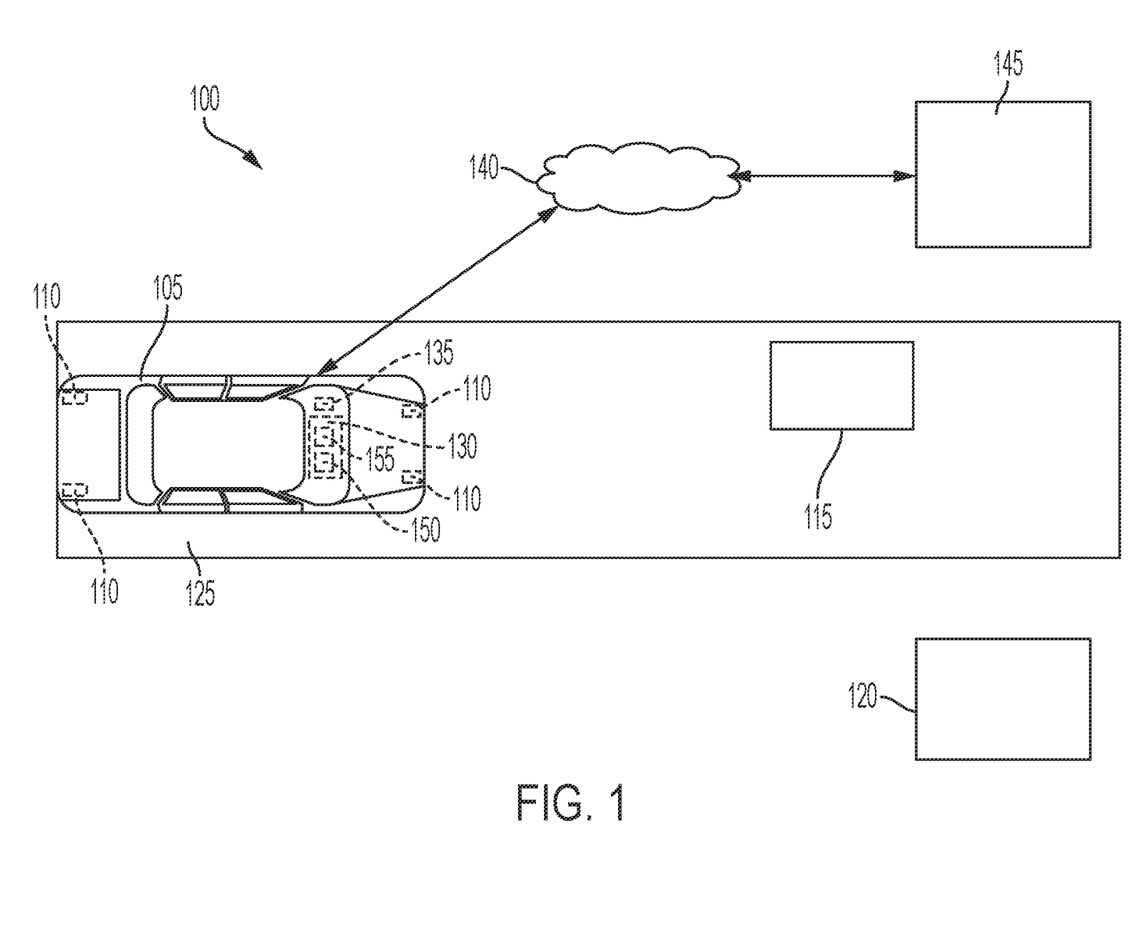
FIG. 1 is an example of a system for performing attentional sampling on images captured by one or more sensors (e.g., cameras) coupled to an autonomous vehicle, in accordance with various embodiments of the present disclosure.

Referring now to FIG. 1, a system 100 for performing attentional sampling on images captured by one or more sensors 110 (e.g., cameras) coupled to an AV 105 is illustratively depicted, in accordance with various embodiments of the present disclosure. The sensors 110 are configured to capture images including one or more objects 115, 120 present within an environment of the AV 105. These sensors 110 may, for example, include image capturing devices (e.g., cameras), RADAR systems, light detection and ranging (LIDAR) systems, and/or one or more other suitable sensor types.

As shown in FIG. 1, multiple objects 115, 120 are present in the environment of the AV 105 and visible from the AV 105. It is noted, however, that, depending on the location and position of the AV 105, the number of object visible to the AV 105 may vary. In order to determine a position and/or trajectory for each of these objects 115, 120, a perception module, including a perception system, of the AV 105 must analyze each of the objects 115, 120.

According to various embodiments, the AV 105 is traveling on a road 125. It is noted, however, that any suitable path for the AV 105 may be implemented.

The perception module of the AV 105 may include one or more computing devices 130 configured to receive sensor data pertaining to each of the objects 115, 120. The sensor data is generated by one or more sensors 110. The sensors 110 may include, for example, one or more image capturing devices (e.g., cameras), one or more RADAR systems, one or more LIDAR systems, and/or one or more other suitable sensor types. The computing device 130 may be in electronic communication with the one or more sensors 110. The one or more sensors 110 may be positioned at various positions of the AV 105 such as, for example, the front, rear, and/or sides of the AV 105 and/or any other suitable position or positions. The sensors 110 may include one or more pairs of stereo cameras. According to various embodiments, the AV 105 may include a plurality of sensors 110 encircling the AV 105.

The AV 105 may include a geographic location system configured to determine a location and orientation of the vehicle 105 and/or one or more of the objects 115, 120. The geographic location system may include a Global Positioning System device. It is noted, however, that other forms of geographic location may additionally, or alternatively, be used.

The vehicle 105 may further include a transceiver 135 configured to send and receive digital information from a remote server 145 via a wired and/or wireless connection such as, for example, through a wireless communication network 140, wherein the vehicle 105 and the remote server 145 are in electronic communication with each other. The computing device 130 may include a processor 150. The processor 150 may be configured to receive, using the transceiver 135, information pertaining to features of the environment at the location of the vehicle 105, and use the information and the orientation of the vehicle 105 to identify the one or more objects 115, 120. It is noted that the processor 150 may be a standalone processor 150, the vehicle's 105 processor 150, and/or the remote server's 145 processor 150. Data processed by the processor 150 may be data received from the vehicle 105, received from the remote server 145, and/or a combination of data received from the vehicle 105 and the remote server 145. According to various embodiments, the computing device 130 may include one or more digital memory devices 155 and some or all of the digital information may be stored locally at the vehicle 105.

Each of the sensors 110 is configured to sense and generate data pertaining to each of the objects 115, 120. The processor 150 is configured to analyze the sensor 110 data in order to detect each of the objects 115, 120 and may determine, for each object 115, 120, a type of object (e.g., vehicle, pedestrian, bicycle, and/or another other suitable type of object), whether the object 115, 120 is in motion, and/or, if the object 115, 120 is in motion, a velocity and trajectory of the object 115, 120.

The one or more computing devices 130 may include and/or provide functions of the perception module of the AV 105 and the motion planning module of the AV 105. The perception module executes programming instructions to process the perception data received from the AV's sensors and identify objects that appear in the perception data. Categorical labels that the perception module may apply to perception data include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in Yurtsever et al., "A Survey of Autonomous Driving: Common Practices and Emerging Technologies" (published in *IEEE Access*, April 2020). The motion planning module will process data received from the other systems, determine a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

It is common for the environment around an AV 105 to be complicated due to, for example, various types of lighting, objects, etc. For example, the environment around the AV 105 may include the one or more objects 115, 120. These objects 115, 120 may be stationary or in motion and may be, or may become, in the path of one or more trajectories of the AV 105. For at least these reasons, increasing the ability of the AV 105 to detect these objects 115, 120 decreases the likelihood that the AV 105 will collide with the objects 115, 120.

The smaller an object is and/or the farther an object is from the AV 105, the smaller the object appears in the images captured by one or more sensors 110. As a result, this decreases the resolution of those objects within the image. In order to better analyze these smaller objects, the resolution of the image must be increased so that the resolution of those objects can be increased. However, increasing the resolution of an image increases the computing power needed to analyze the image. This can result in increased costs and/or wait times for the images to be analyzed, and increased wait times increases the time needed for a motion planning system of the AV 105 to determine a course of action of the AV 105.

According to various embodiments, the perception system of the AV 105 is configured to process a full image at a first resolution, and also configured to attentionally crop images in order to process a small subset of the image at a second, higher resolution which better enabling the perception system to identify smaller and further away objects. According to various embodiments, this attentional sampling is performed in parallel with processing the full image at a lower resolution to identify nearby objects.

The cropped region of the image represents a region of interest which is to be processed at a higher resolution than the full image as a whole. This results in object detection that maximizes detection accuracy subject to a fixed computational budget through a multi-level region of interest selection strategy. On the coarse level, the global field-of-view is processed at a downsampled resolution. This allows the detection system to find large objects without sacrificing performance. At finer levels, the regions of interest on the image are processed, while conserving processing resources and/or maintaining processing budget constraints such that large objects may be classified at a low resolution while smaller objects are classified at a high resolution.

According to various embodiments, the full image and the cropped region are fed into a neural network run on the computing device 130 in order to process the full image and the cropped region.

According to various embodiments, the neural network is a pretrained neural network such as, for example, a pretrained Convolutional Neural Network (CNN) configured to extrapolate whether one or more objects are present in a captured image. It is noted, however, that other forms of neural network such as, for example, a Recurrent Neural Network (RNN), may alternatively or additionally be used in accordance with the spirit and principles of the present disclosure.

According to various embodiments, the CNN is pretrained using known objects. With the variety of available and as-yet-undetermined types of objects, the CNN enables the system to be capable of being retrained to detect the various types of objects. According to various embodiments, object data (e.g., shape, color, size, etc.) of various known types of objects are associated with appropriate metadata such as, for example, the type, shape, color, and size of various objects and used to train the CNN. Once the CNN is pretrained for detecting one or more emergency signals, the CNN can be incorporated in the computing device or devices 130 of the AV 105.

According to various embodiments, cropped region of the image can be a fixed region of the image or may be determined based on information from 3D mapping data and/or an attentional machine learning mechanism.

According to some embodiments, once the cropped region of the image is determined, the cropped region of the image is processed at the second resolution independently from the processing of the whole image at the first resolution. Once this image processing is completed, the processing outputs are fused together.

Figure 2:
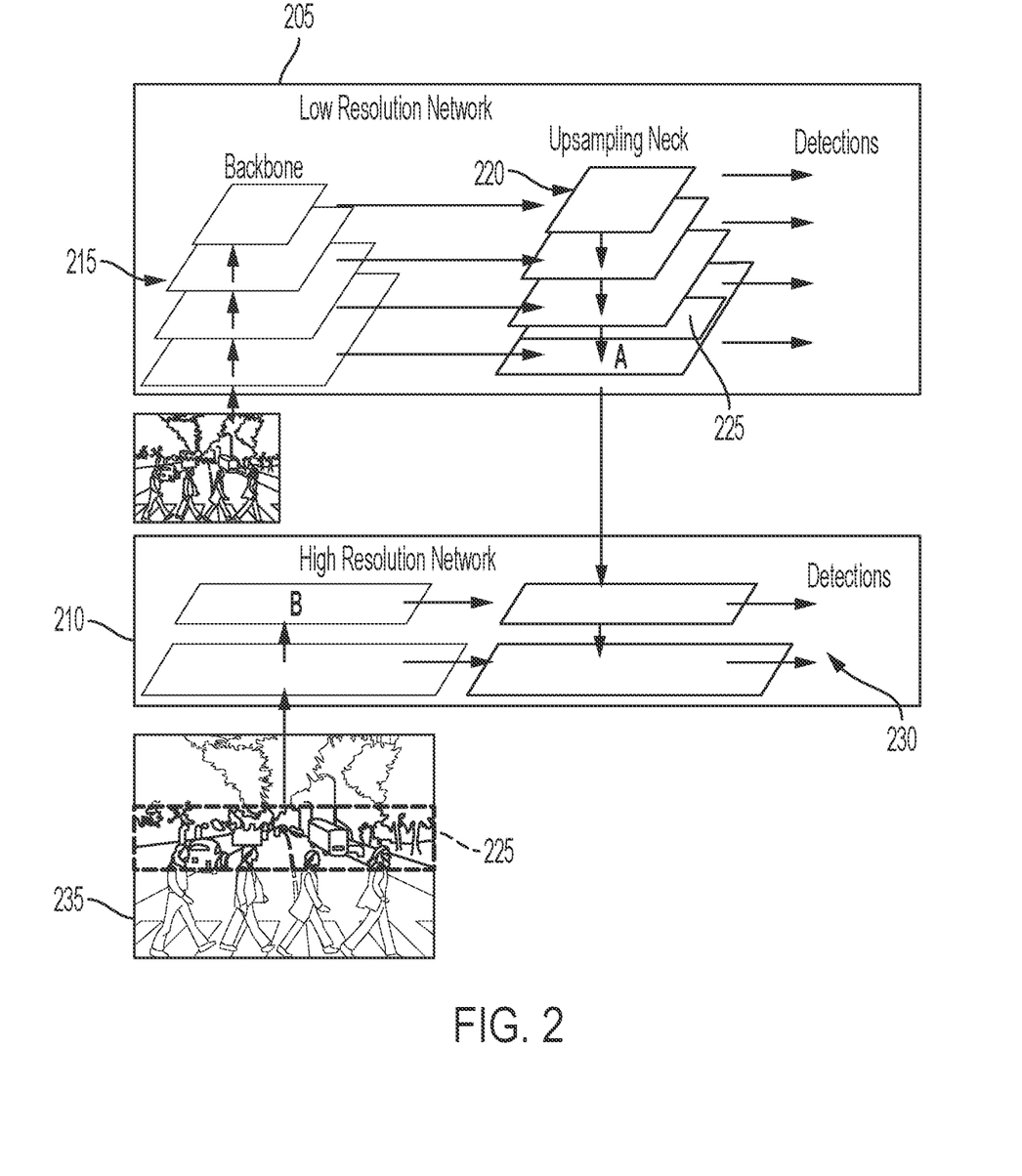
FIG. 2 is an example of a process of performing attentional sampling on an image, in accordance with various embodiments of the present disclosure.

According to some embodiments, once the cropped region of the image is determined, the cropped region of the image is processed at the second resolution in conjunction with the processing of the whole image at the first resolution, leveraging features from the first resolution to provide a larger context for the second, higher resolution features, as shown in FIG. 2.

As shown in FIG. 2, the image 235 is processed using a low resolution network 205 and a high resolution network 210.

According to various embodiments, the low resolution network 205 is a multi-level feature extraction network. According to various embodiments, in the low resolution network 205, an image 235 having an initial size is input into the network and downsampled 215 to a desired sampling rate. This produces a low resolution feature map including object detections. The features are then fed to an upsampling "neck" such as a feature pyramid network to upscale 220 the features back to a higher resolution. This produces a first feature map.

In the high resolution network 210, a cropped portion 225 of the image is extracted. This cropped region is fed through a subset of the upsampling neck 230, producing a second feature map. According to various embodiments, the corresponding region of the first feature map is then cropped and resized to the second feature map, and the first and second feature maps are then fused together, forming a third feature map. This third feature map can than, optionally, be further upsampled with a high resolution "neck".

Figure 3A:
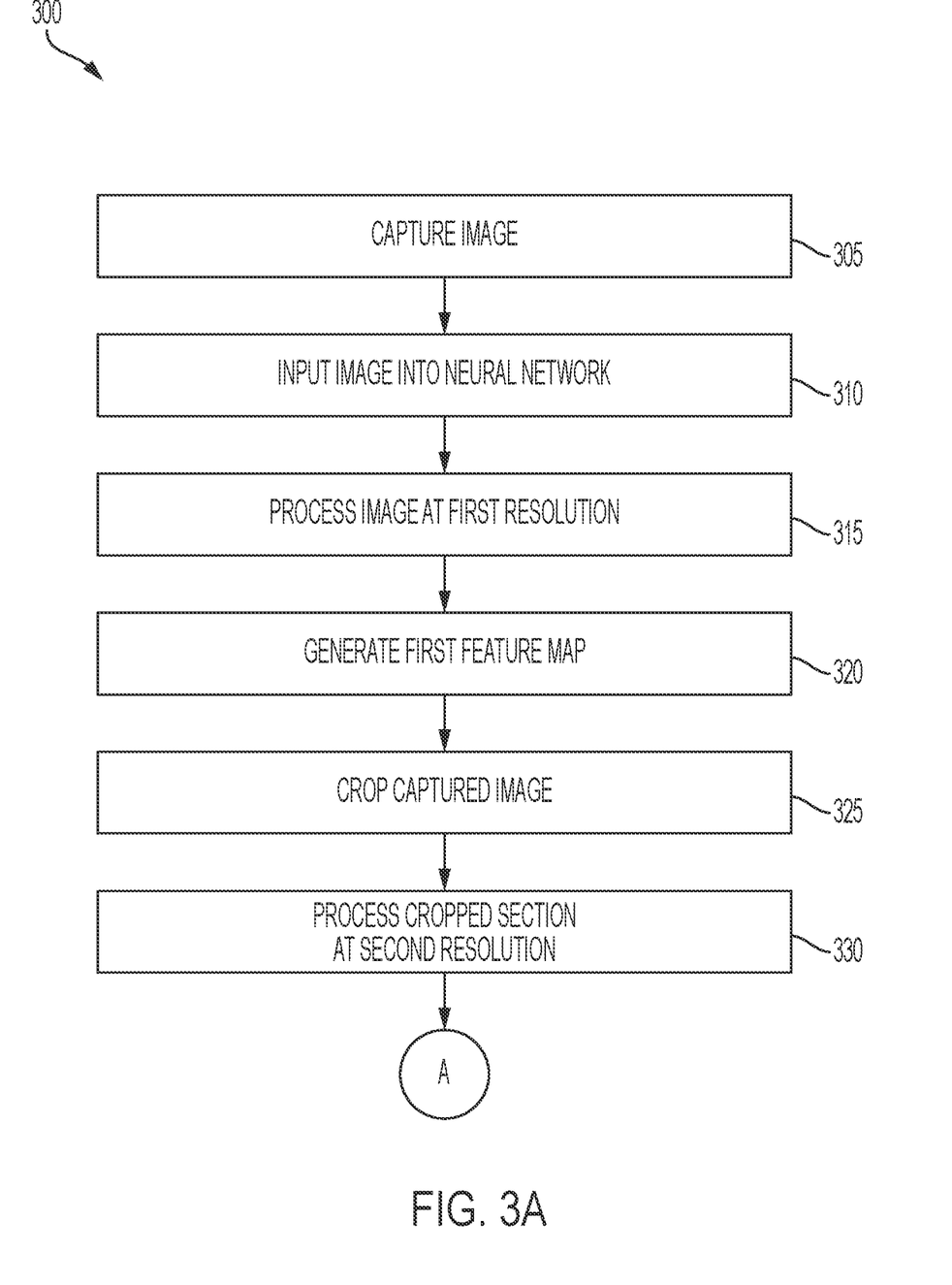
FIGS. 3A-3B illustrate a flowchart of a method for performing attentional sampling on images captured by one or more sensors coupled to the autonomous vehicle, in accordance with various embodiments of the present disclosure.
Figure 3B:
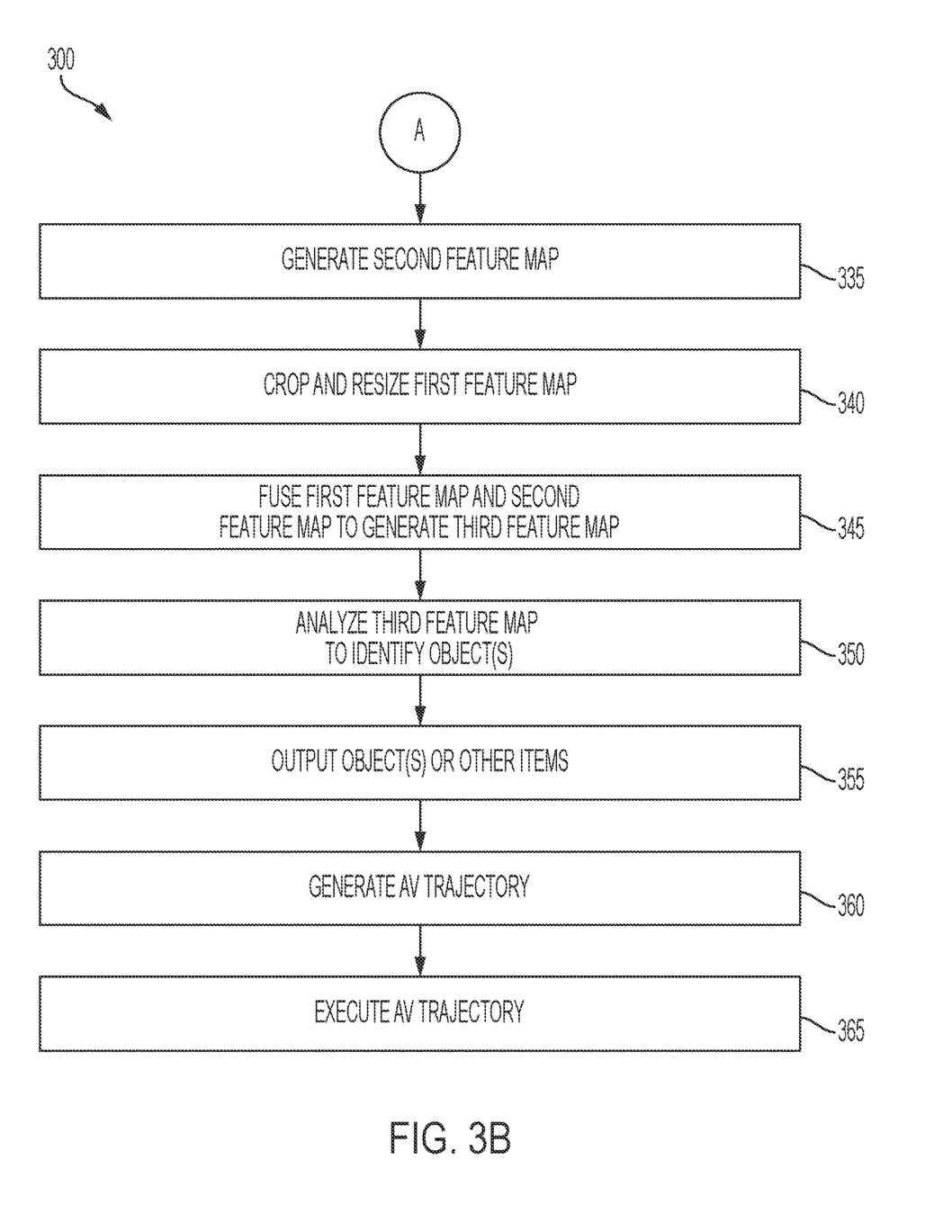

Referring now to FIGS. 3A-3B, a method 300 for performing attentional sampling on images captured by one or more sensors (e.g., sensors 110 of FIG. 1) coupled to an AV is illustratively depicted. According to various embodiments, the attentional sampling enables long range object detection for the AV.

At 305, an image is captured using at least one of the one or more sensors in electronic communication with an autonomous vehicle. The image represents a section of a surrounding environment of the AV that is visible from the AV. At 310, the image is input into a neural network run on a computing device of the AV. According to various embodiments, the neural network is pretrained to detect one or more objects present in the captured image.

Using the neural network, at 315, the image is processed at a first resolution in order, at 320, to generate a first feature map that classifies one or more object features within the captured image. According to some embodiments, processing the image at the first resolution includes processing the image with a feature extraction network, upsampling the one or more object features within the image to a higher resolution in the first feature map.

The image, at 325, is cropped to extract a cropped section of the captured image for processing. According to various embodiment, prior to cropping the image, the computing device of the AV is configured to determine the cropped area of the image. According to some embodiments, the cropped area is determined to be a region of the captured image including one or more objects that are found in 3-dimensional map data of an environment surrounding the AV. In some embodiments, the cropped area is determined to be a region of interest determined via an attentional machine learning analysis of the environment surrounding the AV.

Using the neural network, at 330, the cropped section is processed at a second resolution that is higher than the first resolution. This generates a second feature map, at 335, that classifies one or more object features within the cropped section. The first feature map, at 340, is then cropped and resized to match a size and corresponding region of the cropped section of the image. According to some embodiments, the processing the cropped section includes upsampling the one or more object features within the cropped section to a higher resolution in the second feature map. According to some embodiments, the processing the image at the first resolution is performed concurrently with the processing the cropped section at the second resolution. According to some embodiments, the processing the image at the first resolution is performed independently from the processing the cropped section at the second resolution.

At 345, the first feature map and the second feature map are fused, generating a third feature map. This third feature map includes object classifications from the second feature map for the one or more object features that are classified in the second feature map, and object classifications from the first feature map for one or more object features that at least partially appear in the cropped first feature map but are not classified in the second feature map.

At 350, using the neural network, the third feature map is analyzed in order to identify one or more objects within the fused feature map that will be positioned in a first trajectory of the AV. The objects may be in the form of bounding boxes and labels, or other forms. In addition or alternatively, the network may identify one or more cuboids, or a semantic segmentation of the fused maps. At 355 the system may output the identified object(s) (and/or cuboids or semantic segmentation) to another process, such as a motion planning system that will use the output to generate a trajectory for the AV at 360. The new trajectory of the AV will configured to cause the AV to avoid the one or more objects that were positioned within the first trajectory of the AV. At 365, the motion planning system of the AV, using the object data from the third feature map, plans and executes an AV trajectory based on the object data.

Figure 4:
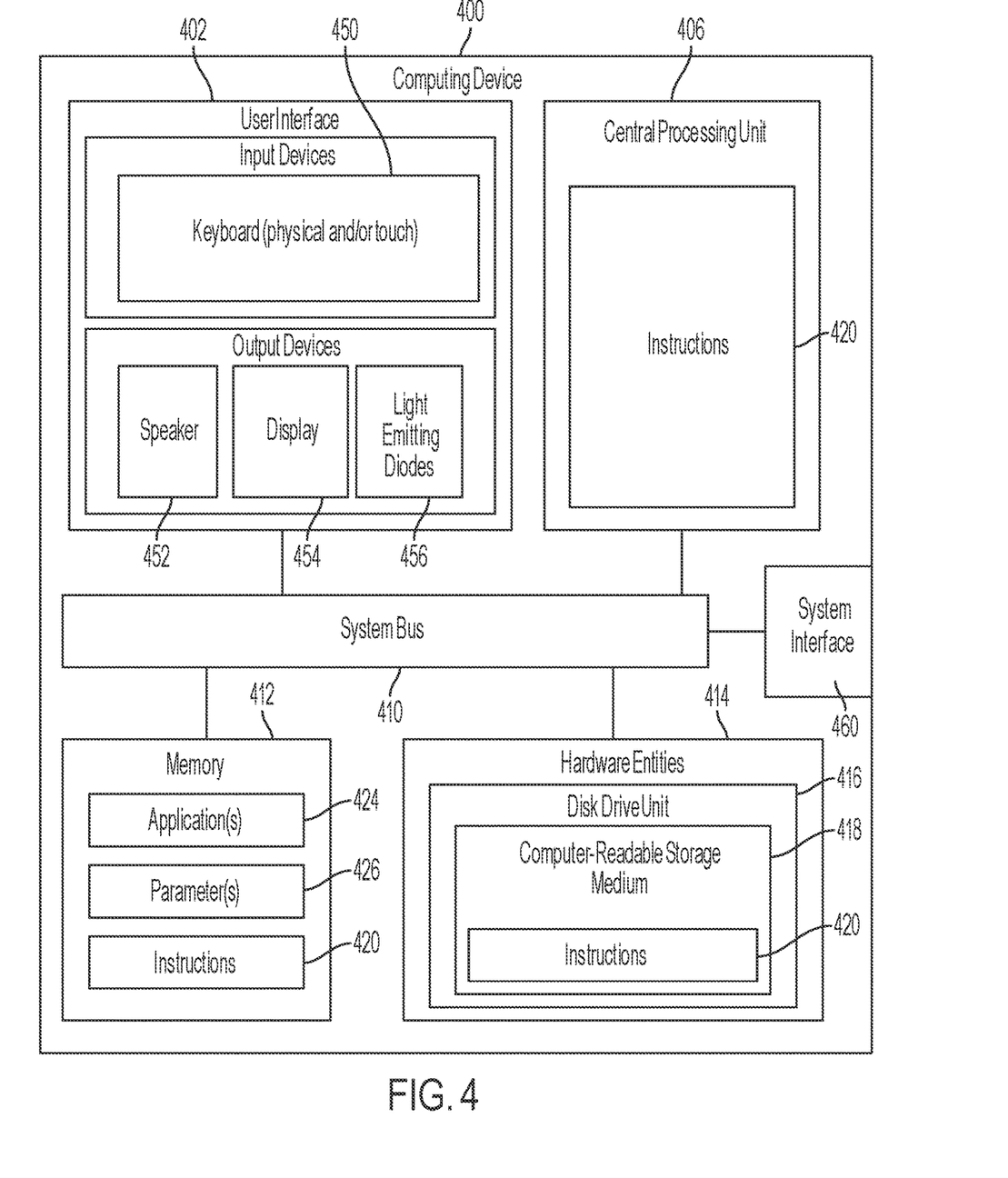
FIG. 4 is an illustration of various elements of an illustrative computing device, in accordance with the present disclosure.

Referring now to FIG. 4, an illustration of an illustrative architecture for a computing device 400 is provided. The computing device 130 of FIG. 1 is the same as or similar to computing device 400. As such, the discussion of computing device 400 is sufficient for understanding the computing device 130 of FIG. 1.

Computing device 400 may include more or less components than those shown in FIG. 1. However, the components shown are sufficient to disclose an illustrative solution implementing the present solution. The hardware architecture of FIG. 4 represents one implementation of a representative computing device configured to one or more methods and means for object detection, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit ("CPU") 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices include, but are not limited to, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, etc.).

At least some of the hardware entities 414 perform actions involving access to and use of memory 412, which can be a random access memory ("RAM"), a disk drive, flash memory, a compact disc read only memory ("CD-ROM") and/or another hardware device that is capable of storing instructions and data. Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Figure 5:
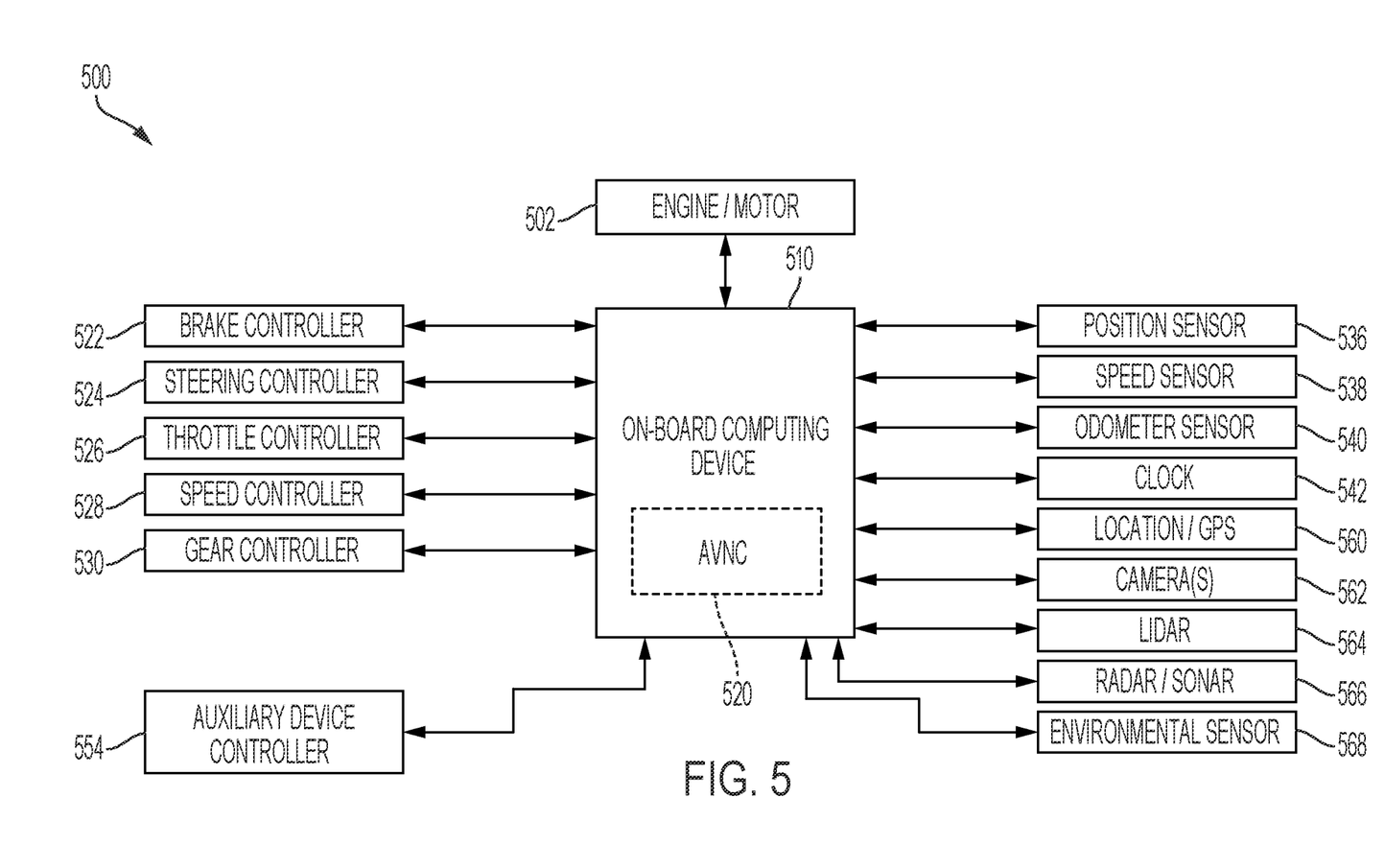
FIG. 5 illustrates example elements of an autonomous vehicle, in accordance with various embodiments of the present disclosure.

FIG. 5 illustrates an example system architecture 500 for a vehicle, such as an autonomous vehicle (e.g., AV 105, as shown in FIG. 1). The vehicle 105 may include an engine or motor 502 and various sensors for measuring various parameters of the vehicle and/or its environment. Operational parameter sensors that are common to multiple types of vehicles include, for example: a position sensor 536 such as an accelerometer, gyroscope and/or inertial measurement unit; a speed sensor 538; and an odometer sensor 540. The vehicle 105 also may have a clock 542 that the system architecture 500 uses to determine vehicle time during operation. The clock 542 may be encoded into the vehicle on-board computing device 510, it may be a separate device, or multiple clocks may be available.

The vehicle 105 also may include various sensors that, together with a processor and programming instructions, serve as the object detection system that operates to gather information about the environment in which the vehicle is traveling. These sensors may include, for example: a location sensor 560 such as a GPS device; object detection sensors such as one or more cameras 562 (for example, cameras 110 in FIG. 1); a LiDAR sensor system 564; and/or a radar and or and/or a sonar system 566. The sensors also may include environmental sensors 568 such as a precipitation sensor and/or ambient temperature sensor. The object detection sensors may enable the vehicle 105 to detect objects that are within a given distance or range of the vehicle 105 in any direction, while the environmental sensors collect data about environmental conditions within the vehicle's area of travel. The system architecture 500 will also include one or more cameras 562 for capturing images of the environment. Any or all of these sensors will capture sensor data that will enable one or more processors of the vehicle's on-board computing device 510 (for example, computing device 130 and/or 400) and/or external devices to execute programming instructions that enable the computing system to classify objects in the perception data, and all such sensors, processors and instructions may be considered to be the vehicle's perception system. The vehicle also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle that may encounter or affect in its environment.

During operations, information is communicated from the sensors to an on-board computing device 510. The on-board computing device 510 analyzes the data captured by the sensors and optionally controls operations of the vehicle based on results of the analysis. For example, the on-board computing device 510 may control braking via a brake controller 522; direction via a steering controller 524; speed and acceleration via a throttle controller 526 (in a gas-powered vehicle) or a motor speed controller 528 (such as a current level controller in an electric vehicle); a differential gear controller 530 (in vehicles with transmissions); and/or other controllers such as an auxiliary device controller 554. The on-board computing device 510 may include an autonomous vehicle navigation controller 520 configured to control the navigation of the vehicle through an intersection. In some embodiments, the intersection may include traffic signal lights. In some embodiments, an intersection may include a smart node. In some embodiments, the on-board computing device 510 may be configured to switch modes (augmented perception mode and non-augmented perception mode) based on whether Augmented Perception Data (APD) is available if the vehicle is in-range of an intersection.

Geographic location information may be communicated from the location sensor 560 to the on-board computing device 510, which may then access a map of the environment that corresponds to the location information to determine known fixed features of the environment such as streets, buildings, stop signs and/or stop/go signals. Captured images from the cameras 562 and/or object detection information captured from sensors such as a LiDAR system 564 is communicated from those sensors) to the on-board computing device 510. The object detection information and/or captured images may be processed by the on-board computing device 510 to detect objects in proximity to the vehicle 105. In addition or alternatively, the vehicle 105 may transmit any of the data to a remote server system for processing. Any known or to be known technique for making an object detection based on sensor data and/or captured images can be used in the embodiments disclosed in this document.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

The invention claimed is:

1. A method for performing long range object detection for an autonomous vehicle (AV), comprising:
using a trained neural network to process an image at a first resolution and generate a first feature map that classifies one or more objects within the image, wherein the image comprises an image captured using a sensor coupled to the AV;
cropping the image to extract a cropped section of the image;
processing, by the trained neural network, the cropped section at a second resolution that is higher than the first resolution to generate a second feature map that classifies one or more of the objects that appear within the cropped section;
cropping the first feature map to match a corresponding region of the cropped section of the image;
fusing the cropped first feature map and the second feature map to generate a third feature map,
wherein the third feature map includes object classifications from the second feature map for the one more objects that are classified in the second feature map, and object classifications from the first feature map for one or more objects that at least partially appear in the cropped first feature map but are not classified in the second feature map;
analyzing the third feature map to identify one or more objects that are positioned in a first trajectory of the AV;
outputting the object classifications for the one or more objects identified during said analyzing to a system of the AV;
performing operations by the system to generate a second trajectory for the AV based on the third feature map and object classifications; and
causing the AV to follow the second trajectory.

2. The method of claim 1, wherein the cropped section comprises:
a region including one or more objects that are found in 3-dimensional map data of an environment surrounding the AV; or
a region of interest determined via an attentional machine learning analysis of the environment surrounding the AV.

3. The method of claim 1, wherein processing the image at the first resolution includes processing the image with a feature extraction network and upsampling one or more object features within the image to a higher resolution in the first feature map.

4. The method of claim 1, wherein the processing the cropped section includes upsampling one or more object features within the cropped section to a higher resolution in the second feature map.

5. The method of claim 1, wherein the processing the image at the first resolution is performed concurrently with the processing the cropped section at the second resolution.

6. The method of claim 1, wherein the processing the image at the first resolution is performed independently from the processing the cropped section at the second resolution.

7. A system for performing long range object detection for an autonomous vehicle (AV) comprising:
one or more sensors coupled to the AV and configured to capture an image; and
a computing device coupled to the AV, wherein the computing device includes a processor and memory, wherein the memory includes instructions that, when executed by the processor, cause the processor to:
use a trained neural network to process an image captured by the one or more sensors at a first resolution and to generate a first feature map that classifies one or more objects within the image;
crop the image to extract a cropped section of the image for processing;
process, using the trained neural network, the cropped section at a second resolution that is higher than the first resolution to generate a second feature map that classifies one or more objects within the cropped section;
crop the first feature map to match a corresponding region of the cropped section of the image;
fuse the cropped first feature map and the second feature map to generate a third feature map, wherein the third feature map includes object classifications from the second feature map for the one more objects that are classified in the second feature map, and object classifications from the first feature map for one or more objects that at least partially appear in the cropped first feature map but are not classified in the second feature map;
analyze the third feature map to identify one or more objects that are positioned in a first trajectory of the AV;
output the object classifications for the one or more objects identified during an analysis of the third feature map to a system of the AV;
perform operations by the system to generate a second trajectory for the AV based on the third feature map and object classifications; and
cause the AV to follow the second trajectory.

8. The system of claim 7,
wherein the second trajectory is configured to cause the AV to avoid the one or more objects that are in the third feature map.

9. The system of claim 7, wherein the instructions to crop the image comprise instructions to extract a cropped section that is:
a region including one or more objects that are found in 3-dimensional map data of an environment surrounding the AV; or
a region of interest determined via an attentional machine learning analysis of the environment surrounding the AV.

10. The system of claim 7, wherein the instructions to process the image at the first resolution include instructions to process the image with a feature extraction network and upsampling one or more object features within the image to a higher resolution in the first feature map.

11. The system of claim 7, wherein the instructions to process the cropped section include instructions to upsample one or more object features within the cropped section to a higher resolution in the second feature map.

12. The system of claim 7, wherein the instructions to process the image at the first resolution comprise instructions to do so performed concurrently with processing the cropped section at the second resolution.

13. The system of claim 7, wherein the instructions to process the image at the first resolution comprise instructions to do so independently from processing the cropped section at the second resolution.

14. A non-transitory computer-readable medium that stores instructions that are configured to, when executed by a computing device, cause the computing device to:
- use a trained neural network to process an image at a first resolution and generate a first feature map that classifies one or more objects within the image, wherein the image comprises an image captured using a sensor coupled to an autonomous vehicle (AV);
- crop the image to extract a cropped section of the image for processing;
- use the trained neural network to process the cropped section at a second resolution that is higher than the first resolution to generate a second feature map that classifies one or more objects within the cropped section;
- crop the first feature map to match a corresponding region of the cropped section of the image;
- fuse the cropped first feature map and the second feature map to generate a third feature map;
  - wherein the third feature map includes object classifications from the second feature map for the one more objects that are classified in the second feature map, and object classifications from the first feature map for one or more objects that at least partially appear in the cropped first feature map but are not classified in the second feature map, and output the object classifications of the third feature map to a system of the AV;
- analyze the third feature map to identify one or more objects that are positioned in a first trajectory of the AV;
- output the object classifications for the one or more objects identified during an analysis of the third feature map to a system of the AV;
- perform operations by the system to generate a second trajectory for the AV based on the third feature map and object classifications; and
- cause the AV to follow the second trajectory.

15. The non-transitory computer-readable medium of claim 14, wherein the second trajectory is configured to cause the AV to avoid the one or more objects.

16. The non-transitory computer-readable medium of claim 14, wherein the instructions to process the image at the first resolution comprise instructions to process the image with a feature extraction network and upsample one or more object features within the image to a higher resolution in the first feature map.

* * * * *